(12) United States Patent
Ghafari et al.

(10) Patent No.: US 12,233,614 B2
(45) Date of Patent: Feb. 25, 2025

(54) AUTO EXTRUDED SPLIT/SPHERICAL TEE AND FULL ENCIRCLEMENT SADDLE

(71) Applicant: TEAM INDUSTRIAL SERVICES, INC., Sugar Land, TX (US)

(72) Inventors: Rizk Ghafari, Sugar Land, TX (US); Keith Kobayashi, Sugar Land, TX (US); Gerald Blackwell, Sugar Land, TX (US)

(*) Notice: Subject to any disclaimer, the term of this patent is extended or adjusted under 35 U.S.C. 154(b) by 648 days.

(21) Appl. No.: 17/311,282

(22) PCT Filed: Dec. 6, 2019

(86) PCT No.: PCT/US2019/065031
§ 371 (c)(1),
(2) Date: Jun. 4, 2021

(87) PCT Pub. No.: WO2020/118229
PCT Pub. Date: Jun. 11, 2020

(65) Prior Publication Data
US 2022/0055328 A1    Feb. 24, 2022

Related U.S. Application Data

(60) Provisional application No. 62/776,710, filed on Dec. 7, 2018.

(51) Int. Cl.
*B21C 37/29*    (2006.01)
*B23P 23/06*    (2006.01)
(Continued)

(52) U.S. Cl.
CPC ............ *B29D 23/003* (2013.01); *B21C 37/29* (2013.01); *B23P 23/06* (2013.01); *B25J 9/1687* (2013.01);
(Continued)

(58) Field of Classification Search
CPC ....... B21C 23/04; B21C 23/085; B21C 23/14; B21C 23/212; B21C 31/00; B21C 33/00;
(Continued)

(56) References Cited

U.S. PATENT DOCUMENTS 2,123,416 A * 7/1938 Graham .................... B22F 3/20
428/583
3,210,984 A * 10/1965 Arbogast ................. B21J 9/027
72/402

(Continued)

FOREIGN PATENT DOCUMENTS

CN    1038341314 A * 6/2014
CN    108746237 A * 11/2018
(Continued)

OTHER PUBLICATIONS

International Search Report and Written Opinion in related application PCT/US2019/065031 dated Feb. 19, 2020.

*Primary Examiner* — Edward T Tolan
(74) *Attorney, Agent, or Firm* — Patterson + Sheridan, LLP (57) ABSTRACT

The disclosure describes an automated system and method to manufacture extruded split tees, spherical tees, and full encirclement saddle (FES) component parts. The system and method provide for the manufacture of pipe reinforcement components from raw material plates, comprising: an input storage for the raw material plates; one or more ovens for heating the plates; one or more extrusion presses for extruding the heated raw material plates into one or more pipe reinforcement components and an output storage for the pipe reinforcement components. A robotic device is adapted to automatically access and perform operations at the input storage, at the one or more ovens, at the one or more extrusion presses, and at the output storage.

14 Claims, 7 Drawing Sheets

(51) Int. Cl.
- *B25J 9/16* (2006.01)
- *B25J 11/00* (2006.01)
- *B25J 15/00* (2006.01)
- *B29D 23/00* (2006.01)
- *F16L 47/32* (2006.01)
- *F16L 57/00* (2006.01)

(52) U.S. Cl.
CPC ......... *B25J 9/1697* (2013.01); *B25J 11/0065* (2013.01); *B25J 15/0019* (2013.01); *F16L 47/32* (2013.01); *F16L 57/00* (2013.01)

(58) Field of Classification Search
CPC ......... B21C 35/02; B21C 37/29; B23P 23/06; B25J 9/1697; B25J 15/0019; B29D 23/003
See application file for complete search history.

(56) References Cited

U.S. PATENT DOCUMENTS

| | | |
|---|---|---|
| 3,254,909 A | 6/1966 | Ver Nooy |
| 3,360,284 A | 12/1967 | Ver Nooy |
| 3,433,507 A | 3/1969 | Ver Nooy |
| 3,489,441 A | 1/1970 | Malcolm |
| 5,340,160 A | 8/1994 | Meijers et al. |
| 5,359,872 A * | 11/1994 | Nashiki ............ B21D 5/00 72/21.4 |
| 5,692,543 A | 12/1997 | Wood |
| 5,842,496 A | 12/1998 | Delanty et al. |
| 7,815,830 B2 * | 10/2010 | Ohlberg ............ B21C 23/12 264/285 |
| 9,346,210 B2 * | 5/2016 | Robbins ............ B21C 29/04 |
| 9,785,911 B2 * | 10/2017 | Galluzzo ............ B25J 11/00 |
| 2002/0078727 A1 * | 6/2002 | Morales ............ B21D 26/055 72/39 |
| 2012/0260711 A1 * | 10/2012 | Ikeda ............ B21D 37/145 72/252.5 |
| 2019/0099892 A1 * | 4/2019 | Namiki ............ B25J 19/021 |
| 2019/0255706 A1 * | 8/2019 | Atohira ............ G06F 30/20 |

FOREIGN PATENT DOCUMENTS

| | | | |
|---|---|---|---|
| DE | 102010002426 A1 | * | 9/2011 |
| DE | 102011001852 A1 | * | 10/2012 |
| JP | 61-20657 A | * | 1/1986 |
| JP | 06-277749 A | * | 10/1994 |

* cited by examiner

AUTO EXTRUDED SPLIT/SPHERICAL TEE AND FULL ENCIRCLEMENT SADDLE

This application is a National Phase filing under 35 U.S.C. § 371 of International Application PCT/US2019/065031, filed on Dec. 8, 2019, which claims priority to U.S. Provisional Patent Application Ser. No. 62/776,710, filed Dec. 7, 2018, entitled "AUTO EXTRUDED SPLIT T," each of which is incorporated by reference in its entirety for all purposes.

FIELD OF INVENTION

The present disclosure relates generally to split tees, spherical tees and full encirclement saddles (FES). More specifically, the disclosure describes an automated system and method to manufacture extruded component parts for split tees, spherical tees and FES.

BACKGROUND OF INVENTION

Split tees are tees split longitudinally into two semi-annular pieces called run members, wherein at least one run member in the split tee has a branch. The run members are positioned around a pipe, for example, before being welded or bolted together at the seam to hold the split tee in place. Spherical tees are similar to split tees except that they are spherical in shape and have a flange welded directly to the spherical body forming the branch outlet. This allows the spherical tee and its branch to be orientated into various positions as required by its applications. Both types of tees can act as reinforcing structures to the piping they surround and are pressure retaining.

Full encirclement saddles (FES) are similar to split tees in that they have branches and can be split to allow fitting around pipes. Typically, FES are split longitudinally or vertically into multiple-annular pieces, including having splits through the branch. FES are usually used as a reinforcing structure to the piping they are surrounding.

Split/spherical tees and FES are useful in many applications, particular in keeping pipelines in service during maintenance work. As an example, split/spherical tees and FES are especially helpful when hot tapping pipelines for maintenance. When pipelines are hot tapped, lateral openings are cut in the pipe while the pipeline remains in service. This is accomplished by first attaching a split/spherical tee or FES to the pipe and installing a valve on the branch of the split/spherical tee or FES. A hot tapping machine that is designed to extend a cutter through the valve is then mounted to the valve. The hot tapping machine extends the cutter through the valve, cuts a coupon from the wall of the pipe, and then retracts the cutter back through the valve. Thereafter, the valve is closed, and the hot tapping machine is removed, thus completing the lateral connection. Due to their reinforcing nature, FES tend to be used in pipelines subjected to significant cyclic pressurization.

The component parts of the split/spherical tees and FES are manufactured through a series of manual processes. Raw material plates from which the component parts are manufactured are grabbed, carried and manipulated manually with tongs or manual lifting devices throughout the manufacturing process, from conventional ovens to extrusion presses. This results in a slow production of non-uniform, non-repeatable parts manufacture. Such manual manipulation also exposes the operators to dangerous environments, such as extreme temperatures.

Thus, what is needed is an improved manufacturing process that can provide extruded split/spherical tees and FES component parts with improved precision and repeatability while minimizing the manual manipulation of component parts to improve the overall safety of the operation. Ideally, the improved manufacturing process will also decrease production time.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

One embodiment of the present disclosure provides a manufacturing cell for the automated manufacture of pipe reinforcement components from raw material plates. The manufacturing cell comprises: (a) an input storage for the raw material plates, (b) one or more ovens for heating the raw material plates, (c) one or more extrusion presses for extruding the raw material plates into pipe reinforcement components, (d) an output storage for the pipe reinforcement components, and (e) a robotic device adapted to automatically access and perform operations at the input storage, at the one or more ovens, at the one or more extrusion presses, and at the output storage.

Another embodiment of the present disclosure provides a method for manufacturing pipe reinforcement components. The method comprises the steps of: (a) retrieving a raw material plate, (b) moving the raw material plate to an oven and inserting the raw material plate into the oven for heating; (c) retrieving the heated raw material plate from the oven after heating; (d) moving the heated raw material plate to an extrusion press; (e) extruding the heated raw material plate into one or more pipe reinforcement components; and (f) retrieving the extruded raw material plate. In the present disclosure, the steps (a) through (f) above are all performed by a robotic device. The robotic device improves the repeatability and precision of pipe reinforcement component parts by more than 90% compared to pipe reinforcement components manufacturing methods that do not utilize robotic devices. The robotic device also reduces the time needed to manufacture custom components by at least 40% compared to pipe reinforcement component parts manufactured without using robotic devices.

Yet another embodiment of the present disclosure provides a pipe reinforcement components made from the process comprising the steps of: (a) retrieving a raw material plate, (b) moving the raw material plate to an oven and inserting the raw material plate into the oven for heating; (c) retrieving the raw material plate from the oven after heating; (d) moving the heated raw material plate to an extrusion press for extrusion; (e) extruding the heated raw material plate into one or more pipe reinforcement components; and (f) retrieving the extruded raw material plate. In the present disclosure, at least one of the steps (a) through (f) above are all performed by a robotic device. The robotic device improves the repeatability and precision of the pipe reinforcement components by more than 90% compared to pipe reinforcement components not manufactured using robotic devices. The robotic device also reduces the time needed to manufacture custom components by at least 40% compared to pipe reinforcement components manufactured without using robotic devices.

Any of the above embodiments can further comprise a control room having a computer processor for sending and receiving information and instructions to the robotic device. In some embodiments, the computer processor sends instructions and receives feedback from the input storage, the one or more ovens, the one or more extrusion presses, and the output storage, too.

In any of the above embodiments, the robotic device reduces the time needed to manufacture pipe reinforcement components by at least 50% compared to pipe reinforcement components manufactured without using robotic devices.

In any of the above embodiments, the one or more ovens can be inductive ovens, allowing for quicker, even heating of the raw material plates. This also reduces the time needed to manufacture the pipe reinforcement components. The combination of both inductive ovens and the robotic device can reduce the time needed to manufacture the component parts by at least 75% compared to pipe reinforcement components manufactured without robotic devices and inductive ovens.

In any of the above embodiments, the repeatability and precision of the pipe reinforcement component parts increases by 95% or more compared to pipe reinforcement components not manufactured using robotic devices. Alternatively, the repeatability and precision of the pipe reinforcement components increases by at least 98% compared to pipe reinforcement components not manufactured using robotic devices.

Any of the above manufacturing cells can also include a cooling station, a shot blast station, a CNC machining station or a machining station, an automated welding station, and an automated painting station, all of which are accessible by the robotic devices.

Any of the above pipe reinforcement components manufacturing processes can include additional steps of cooling the pipe reinforcement components; shot blasting the pipe reinforcement components; machining the pipe reinforcement components; welding a flange on the pipe reinforcement components if it has a branch; painting the pipe reinforcement components; or any combination thereof, all of which can be performed by the robotic device.

Any of the above embodiments, wherein the pipe reinforcement components are split tee components, spherical tee components, or full encirclement saddle components.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. As used herein, the terms "coils", "pipes", and "tubes" are used individually or in combination to mean the internal fluid carrying elements of a fired heater. It should be understood that split tees, spherical tees and full encirclement saddles are types of pipe reinforcements. The terms "run member" and "component parts" are used interchangeable herein to mean the semi-annular, or semi-spherical, pieces forming the tee, saddle, or other pipe reinforcement.

The present disclosure generally relates to an automated system and method to manufacture extruded pipe reinforcement component parts such as split tee, spherical tee and FES component parts. The method and system of the present disclosure improves quality control, including improved repeatability and precision of dimensions and material properties, while also reducing the time needed to manufacture common and custom sized split tees, spherical tees and FES. The automated system and method also improve the efficiency and the safety of the manufacturing process, including improving the safety of the operator. The system and method of the present disclosure is applicable to both size-on-size split tees, spherical tees and FES, as well as reduced branch split tees, spherical tees and FES.

Figure 1A:
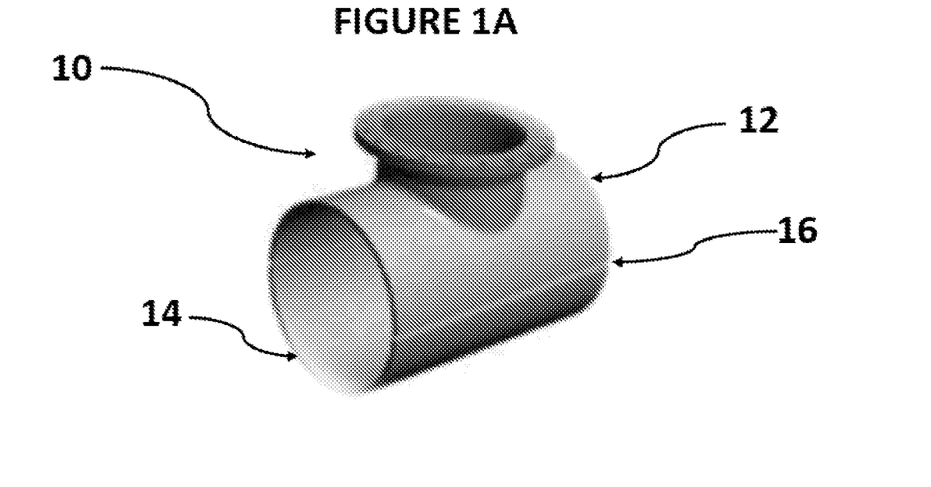
FIGS. 1A-C illustrates an exemplary split tee (FIG. 1A), spherical tee (FIG. 1B), and FES (FIG. 1C), that may be made by the system and method of the present disclosure.
Figure 1B:
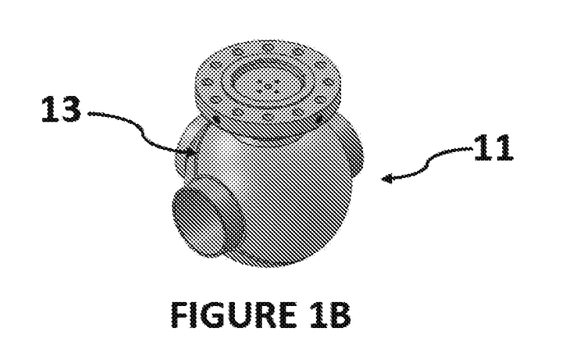
Figure 1C:
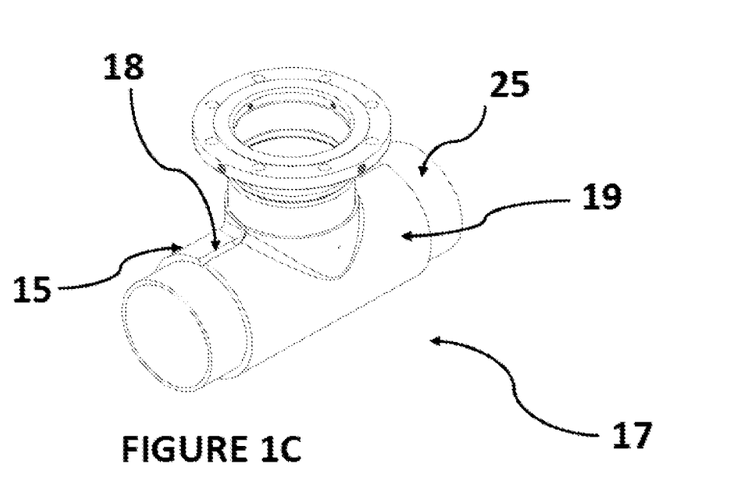

FIGS. 1A-C show an exemplary split tee (FIG. 1A, referred to generally as 10), a spherical tee (FIG. 1B, referred to generally as 11), and a FES (FIG. 1C, referred to generally as 17) that may be made by the automated systems and methods of the present disclosure.

The split tee 10 comprises a branch run member 12 and a lower run member 14. Although the branch run member 12 is shown in FIG. 1A as the upper component, depending on the application, the branch run member 12 may be the lower component of the split tee.

The branch run member 12 and run member 14 are semi-annular components sized to be placed around the pipeline (not shown) and then welded together at the seam 16. In order to ensure a secure weld, it is important that the branch run member 12 and run member 14 mate within acceptable tolerance ranges.

The spherical tee 11 in FIG. 1B has a similar concept to split tee 10, but with semi-spherical shaped components as opposed to the semi-annular parts required by the split tee 10. Due to its shape, spherical tee 11 and its branch can be orientated into various positions as required by the application. The spherical tee 11 also has a seam 13 that must have components parts that mate within acceptable tolerance ranges.

The FES 17 shown in FIG. 1C has two run members (15, 19) that wrap around a pipe 29; however, more than two components parts may be necessary to form an FES. The FES can be split longitudinally or vertically into multiple-annular pieces to fit around a pipe, including having a split at the branch. Thus, the FES can have upper and lower components similar to the split tee 10 in FIG. 1A, or can have vertical "side-by-side" components as shown in FIG. 1C. Though the branch is shown as being on the upper side of the pipe 25 in FIG. 1C, it should be understood that the branch in the FES can be located at any point around the pipe. Similar to the split tee and spherical tee described above, the component parts in the FES must also mate at a seam 18 within acceptable tolerance ranges.

Due to the requirements that the component parts for each of these devices mate within acceptable tolerance ranges, repeatability and precision are important aspects of the split tee, spherical tee, and FES component manufacturing process.

Figure 2:
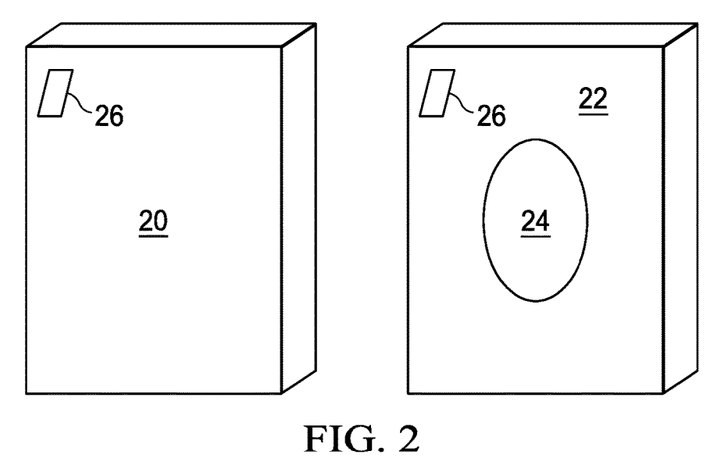
FIG. 2 illustrates exemplary raw material plates used to manufacture the split tee, spherical tee and FES component parts of the present disclosure.

The component parts of a split tee, spherical tee, and FES are manufactured from raw material plates, such as those shown in FIG. 2, through any extrusion/forming process as known in the art. Embodiments of the present disclosure use the same raw material plates (20, 22) that are used in conventional split/spherical tee and FES manufacturing processes. However, it should be understood that the raw material plates (20, 22) are dimensioned and shaped as appropriate for the specific application of the split/spherical tee and FES. Likewise, the material properties of the raw material plates (20, 22) are selected based on the specific application of the split/spherical tee and FES. The systems and methods of the present disclosure are applicable to all such variations in dimensions and material properties of the raw material plates (20, 22).

As shown in FIG. 2, raw material plate 20 is a solid plate that can be extruded to form a non-branched run member, such as run member 14 of the split/spherical tee and FES. Raw material plate 22, however, has an elliptical section 24 already removed, allowing it to be extruded to form a branch run member, such as the branch run member 12 of the split tee 10 or the branch on the FES 17. Raw material plates 20 and 22 are shown as having the same dimensions, however this is not required. Any combination of length, widths, or depths can be used as long as the component parts can be aligned and connected at the seam(s).

In some embodiments of the present disclosure, the raw material plates (20, 22) are tagged with a QR Code, bar code, or other similar technology (26), that links the individual raw material plates to their unique MTR (Material Test Report). This allows for tracking of the plates and subsequent extruded components parts as they move through the manufacturing process, especially for custom split/spherical tee and FES designs. Further, this code 26 can be used if recordation of any variances or alerts arising during the manufacturing process for a particular plate is desired.

Figure 3A:
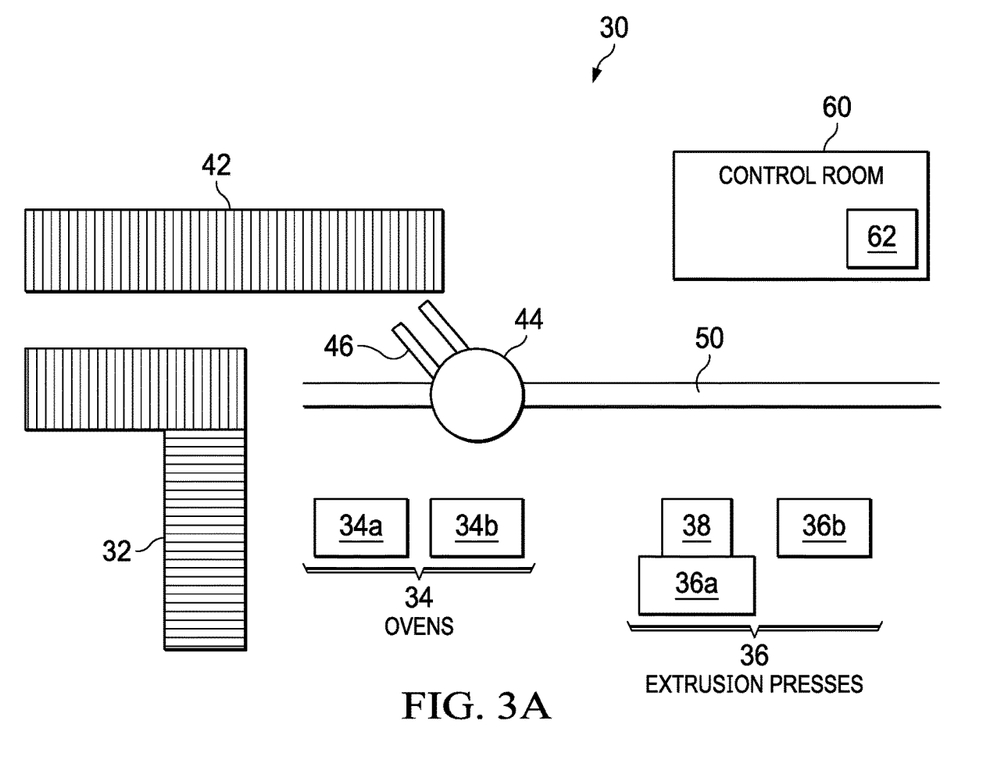
FIG. 3A illustrates one embodiment of a manufacturing cell layout of the present disclosure.
Figure 3B:
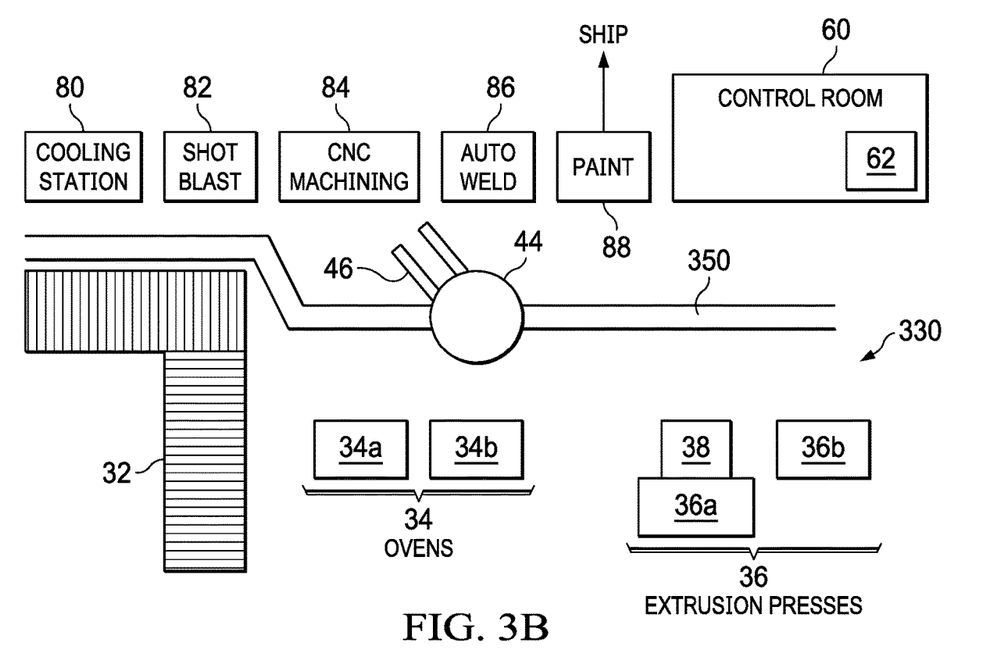
FIG. 3B illustrates an alternative layout for a manufacturing cell of the present disclosure that includes stations for automated final processing of the split tee, spherical tee and FES components.

The components of the present disclosure can be manufactured in a manufacturing cell. Two exemplary embodiments of the presently disclosed manufacturing cell are shown in FIG. 3A and FIG. 3B. The manufacturing cell (referenced generally as 30), comprises an input station 32 upon which raw material plates (20, 22) are loaded as "ready" for the manufacturing process. The raw material plates (20, 22) may be loaded by crane, forklift, manually, or by other known means. The input station can have a storage unit such as a rack or other structure capable of holding the raw material plates (20, 22). Alternatively, the input station can have an inbound conveyor capable of moving the raw material plates (20, 22) from one location to another.

Although FIG. 3A illustrates a system of inbound conveyers forming a right angle as the input station 32, the presently described manufacturing cell is not limited to this layout. The input station 32 may have a single conveyor instead of the system of conveyers shown in FIG. 3A. Alternatively, the input station 32 can have any number of conveyors in any layout, or any number of storage units in any layout. Further, it should be understood that in some embodiments, the input station 32 can use a combination of inbound conveyors and storage units or other structures capable of holding raw material plates (20, 22), in any layout. All such alternate embodiments of the inbound conveyor or storage units in the input station 32 remain within the purview of the present disclosure.

The embodiment of the present disclosure shown in FIG. 3A further comprises one or more ovens for heating the raw material plate. In the embodiment shown in FIG. 3A, two ovens (34a, 34b) are used. Any type of oven can be used with the disclosed manufacturing cell and may be sized to accommodate various raw material plate (20, 22) sizes, or may be rated to varying temperature degrees depending on the application or raw material specifications. In some embodiments, the oven(s) are induction ovens. Induction ovens allows for heating the product in minutes rather than the hours that other ovens or heat torches commonly used to heat the raw material plate. An induction oven, when combined with the robotic device 44 described below, can reduce the manufacturing time of a split tee, spherical tee, and FES component part by about 75% compared to manufacturing methods that do not utilize induction ovens and robotic devices.

The presently disclosed manufacturing cell 30 also includes one or more extrusion presses (36) for extruding the heated raw material plates into split tee, spherical tee, and FES component parts. Similar to the ovens, the number of presses 36 may vary depending on the application, capacity requirements, size requirements, etc. In the embodiment shown, there are two extrusion presses 36. The larger press 36a accommodates larger sizes of raw material plates, while the smaller press 36b accommodates smaller sizes of raw material plates. For example, the larger press 36a may be designed for raw material plates from 16" to 36", and the smaller press 36b may accommodate raw material plates from 3" to 6". Alternatively, a third extrusion press (not shown) can be added to the manufacturing cell for extruding raw material plates from greater than 6" to less than 16". The number of extrusion presses 36 in the manufacturing cell 30, like the number of ovens 34, is limited by space and needs of the operator.

In some embodiments, the extrusion press can also have a bed shuttle that facilitates loading of the raw material plates (20, 22) into the extrusion press. Bed shuttles can be sliding tables or other such movable surfaces that 'shuttle' the heated raw material plates into the extrusion press. The larger extrusion press 36a in FIG. 3A has a bed shuttle 38.

Figure 4A:
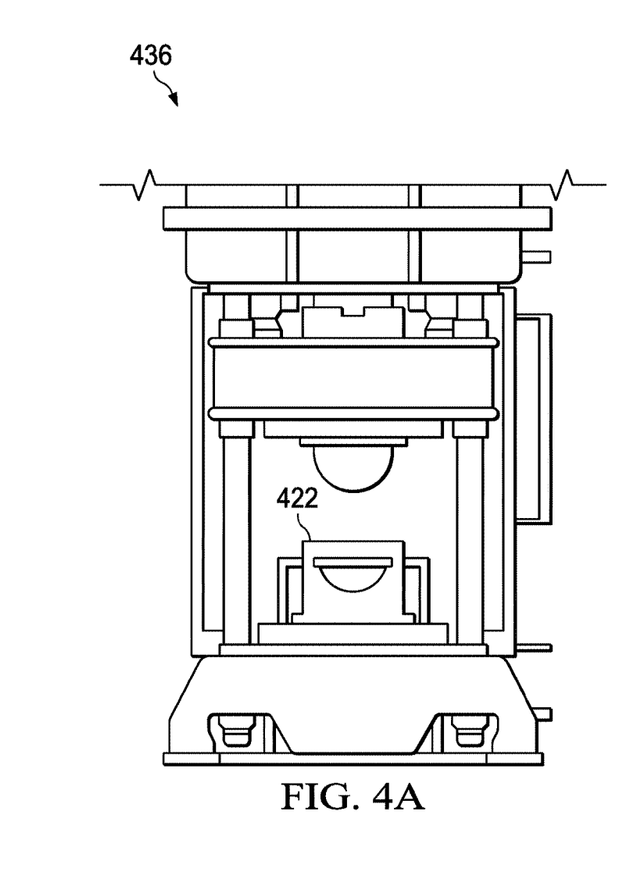
FIG. 4 illustrates example extrusion presses that may be used in embodiments of the present disclosure.
Figure 4B:
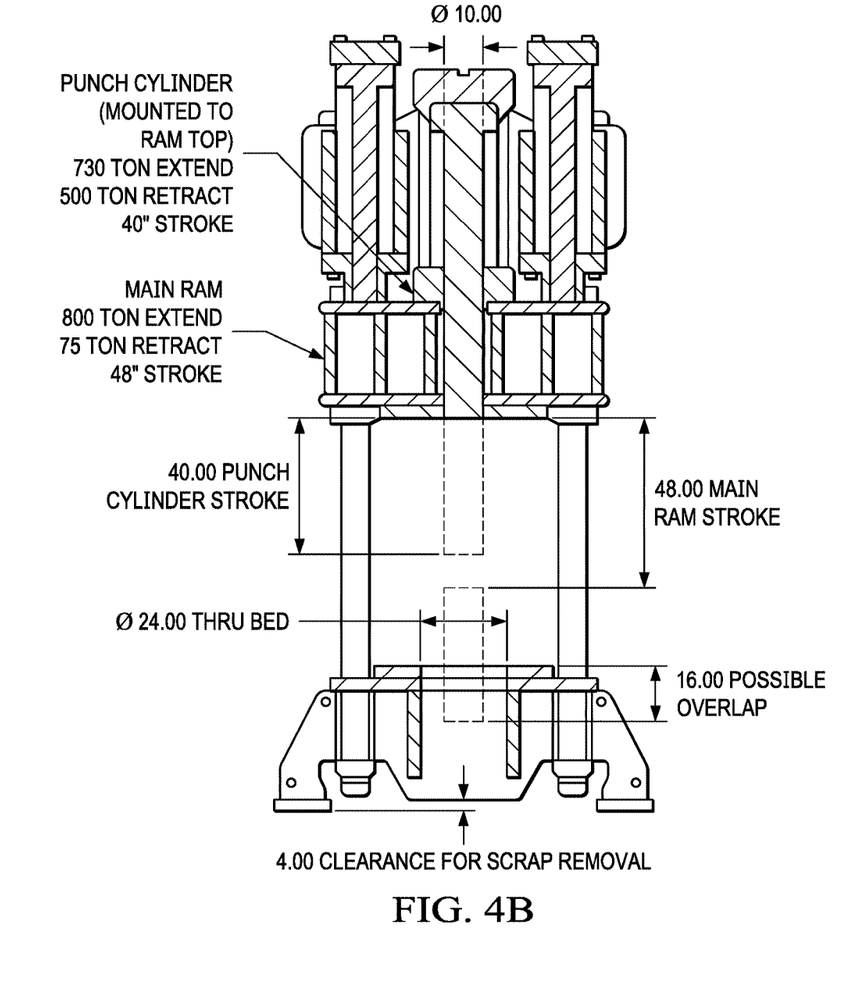

Any known extrusion press in the art may be used in the presently disclosed system and methods. FIGS. 4A-B displays an exemplary extrusion press. FIG. 4A illustrates a side view of an extrusion press 436 having a raw material plate 422 loaded therein. FIG. 4B shows a cross-sectional view of extrusion press 436 having one or more hydraulic die kicker pins 440. The die kicker pins 440 are provided in embodiments of the present disclosure as an additional safety feature of the present disclosure. The die kicker pins 440 are used to eject the component part 422 after it has been extruded by the press 436. The die kicker pins 440 are actuated by the extractor arm of the extrusion press and facilitates retrieval of the extruded parts.

Figure 4C:
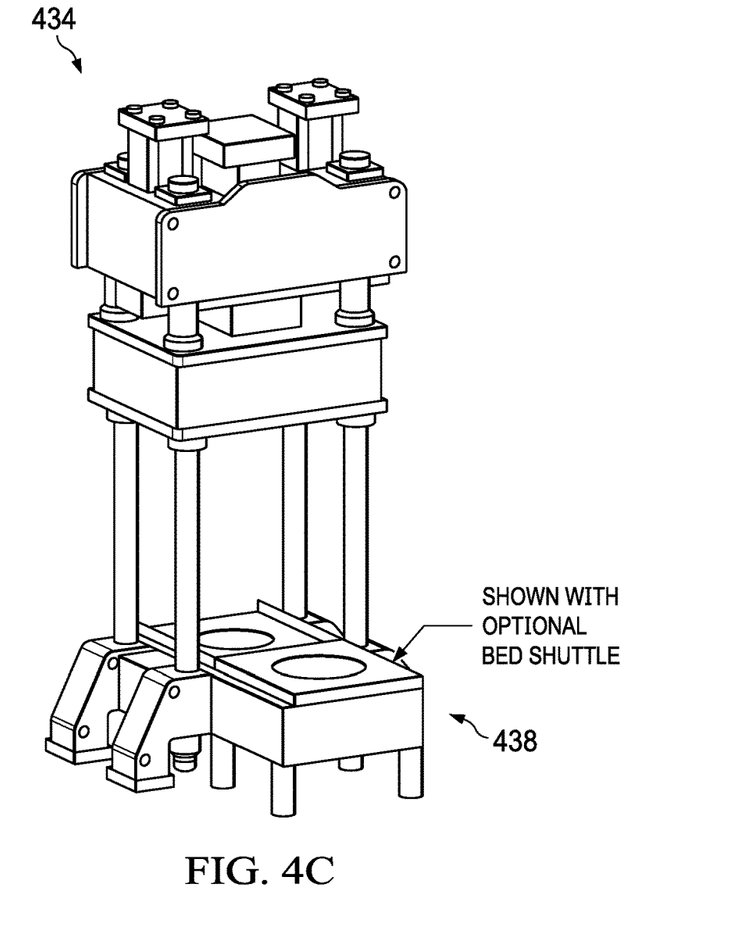

FIG. 4C shows a perspective view of another extrusion press 434. In this embodiment, the extrusion press 434 includes a bed shuttle 438 that is a sliding table that facilitates loading of the raw material plate 422 into the extrusion press 436.

The manufacturing cell 30 can also have an output station 42 upon which hot split tee, spherical tee, and FES component parts are loaded after the extrusion process. The output station can be a storage unit such as a rack or other structure capable of holding, cooling, and/or storing the component parts. Alternatively, the output station 42 can be an outbound conveyor, such as the one shown in FIG. 3A. As with the input station, the output station is not limited to a particular layout of only conveyors or storage units. Any number of conveyors, storage units, or combinations thereof can be used in the output station 42.

In some embodiments of the present disclosure, the extruded parts are placed on the output conveyor 42 after completion of the extrusion process, for cooling, final processing, and/or shipping to the customer. Alternatively, the extruded parts can undergo additional processing (e.g. machining, shot blasting, welding) as shown in FIG. 3B and described below.

The embodiments of the presently disclosed manufacturing cell 30 also include a robotic device 44. The robotic device 44 is designed to automatically pick up the appropriate raw material plates (20, 22) from the input station 32, and move the raw material plates (20, 22) to the ovens 34 for heating. In one embodiment of the present disclosure, the robotic device 44 has a plurality of arms 46, or grippers, that can magnetically lift and/or manipulate the raw material plates (20, 22) when in a cooled state, and have gripping means for lifting and manipulating the raw material plates (20, 22) or extruded split/spherical tee and FES component parts when they are in a heated state. It should be understood that any number of robotic devices known in the art may be used in the present disclosure. The number is only limited by an operator's need and capacity.

Once the raw material plates (20, 22) have been properly heated in the ovens (34a, 34b), the robotic device 44 retrieves the heated plates (20, 22) from the ovens (34a, 34b) and places them on the extrusion presses (36a, 36b), or shuttle 38, for extrusion. After extrusion, the robotic device 44 retrieves the extruded component parts (not shown) from the extrusion presses (36a, 36b) and places the extruded component parts on the output station 42.

In the embodiment shown in FIG. 3A, the robotic device 44 resides in and travels along a track 50. The track 50 enables the robotic device 44 to access all of the equipment in the manufacturing cell 30 in order to enable a fully automated process. The layout shown in FIG. 3A has a linear track 50 but it should be understood that any alternate configuration (e.g. circular, u-shaped, etc.) that enables the robotic device 44 to access the input stations 32, output stations 42, ovens 34 and extrusion presses 36 in a fully automated manner falls within the purview of the present disclosure. However, it is not necessary that the robotic device 44 be able to travel along a track 50. The input station, the ovens, the presses, the output station, and the robotic device can be arranged such that the robotic device 44 only needs rotational movement to access the components of the manufacturing cell. An alternative manufacturing cell layout is shown in FIG. 3B. There, the robotic device 44 is preferably able to also access the additional processing stations (80, 82, 84, 86, 88) using an extended track 350.

FIG. 3A displays a Control Room 60 for facilitating an automated split/spherical tee and FES component manufacturing process. In some embodiments, the Control Room 60 has a computer processor 62 enabling automation and control of the robotic device 44. The schedule for the manufacturing cell 30 is input into the computer processor 62 in order to begin processing the raw material plates (20, 22). The computer processor 62 instructs the robotic device 44 as to the selection and processing of the raw material plates (20, 22). Additionally, the computer processor 62 controls the settings on the ovens 34 and/or the extrusion presses 36.

In some embodiments, the robotic device collects information about the material plates/extruded component parts or the manufacturing process, including inconsistencies with the schedule, and sends the information to the computer processor 62, the Control Room 60, and/or an operator. In more detail, the robotic device is equipped with one or more optical recognition devices, such as laser measuring devices, beams, scanners, IR cameras, video cameras, or other optical devices, or sensors such as temperature, to collect information. The robotic device 44 can further include a transmitter for transmitting the collected information to the computer processor 62 via Bluetooth, proximal telemetry, inductive telemetry, infrared telemetry, Radio Frequency (RF) telemetry, or the like, or a wired connection.

Figure 5:
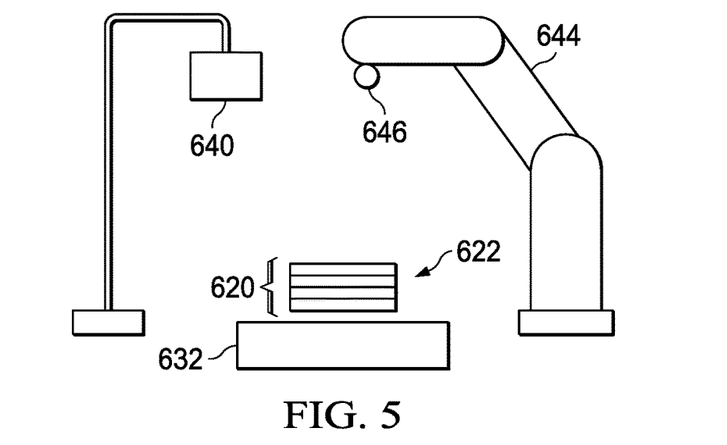
FIG. 5 provides a schematic of the robotic device and QR Reader.

For example, as illustrated schematically in FIG. 5, if the robotic device 644 is initially instructed to pick up a size of plate and a quantity of plate (620), the robotic device 644 can scan the selection of raw material plates 620 on an input station (conveyor 632). Once the particular size plate is identified, the robotic device 644 uses its optical recognition device 646 to determine the height of the top plate (622). Based on the plate height and the height of the conveyor 632 (and any intervening pallets), the robotic device 644 and computer processor 62 can calculate the number of plates (620) and identify variations in dimensions of plates such that the robotic device can select the appropriate plate. Through its optical recognition devices 646, the robotic device 644 can also determine whether or not the raw material plate (622) has an elliptical cutout.

Based on the reading of its optical recognition devices, the robotic device can execute a scheduled program. Once the robotic device picks up a plate from the input station, the QR Code on the plate is read by the QR Reader on the robotic device in order to start tracking of the particular plate for quality control purposes. The robotic device 644 is able to manipulate the appropriate plate to the appropriate oven (if more than one) and the appropriate extrusion press (if more than one). Additionally, the robotic device is able to properly position the plates on the extrusion presses 36 in a consistent, uniform, and repeatable manner.

The robotic device 644 can further include sensors for determining the temperature of the heated material plate after it exits the oven and before the plates are placed on the extrusion press. If the heated material plate is not hot enough, the robotic device can return the material plate to the oven for further heating and transmit this action to the processor 62, control room 60, and/or operator.

Some embodiments of the present disclosure have a Control Room 60 enabling full monitoring and control of the automated processes, including an alert system. By way of example, the robotic device 644 is able to determine whether the raw material plates are within the appropriate temperature range after leaving the ovens. The robotic device 644 can take corrective action if the raw material plates are outside of the appropriate temperature range based on predetermined conditions in the inputted processing program. Further, the out of range temperature and corrective action can be transmitted to the computer processor 62 and displayed on a screen attached to the computer processor in the control room 60. Alternatively, or in addition to, the computer processer 62 can also alert, text, or email the operator if the temperature if the raw material plate is outside of a predetermined range.

Other examples of monitoring and control by the computer processor and/or control room include:

A Robot Operation and Start-up screen that enables the operator to access any piece of equipment in the manufacturing cell. In some embodiments, the Start-up Screen is identical to the hand-held pendant control for the Robotic Device to aid in reducing user error due to familiarity.

An Oven Control screen to enable control of the start up of the ovens, and running conditions of the oven, including monitoring of the heating temperatures.

An Extrusion Press Control screen to enable the set-up and start of the press forming cycle. In some embodiments, the extrusion press control screen can also include a manual override for the extrusion presses, or a manual activation of the die kicker pins.

A Conveyor Control Screen if the input station or output station include conveyors. This screen allows for the operation and monitoring on the in-bound and out-bound conveyor system, including stop/start and speed.

One or more video screens for visual monitoring of input from optical recognition devices on the robotic device. Alternatively, cameras inside the manufacturing cell, separate from the robotic device, can be used to visual monitor the split tee, spherical tee and FES manufacturing process.

The advantages of the presently disclosed manufacturing cell system is the combination of technology that allows for a quicker process, especially for custom sized/shaped tee components, with more precise tee and saddle components. The combination of induction oven(s), unique custom dies, and controlled environment thru data measurement (monitoring of plate temperatures, tonnage to press, and error proofing) allows for the safe mass produce of split/spherical tee and FES components with high flexibility.

Figure 6:
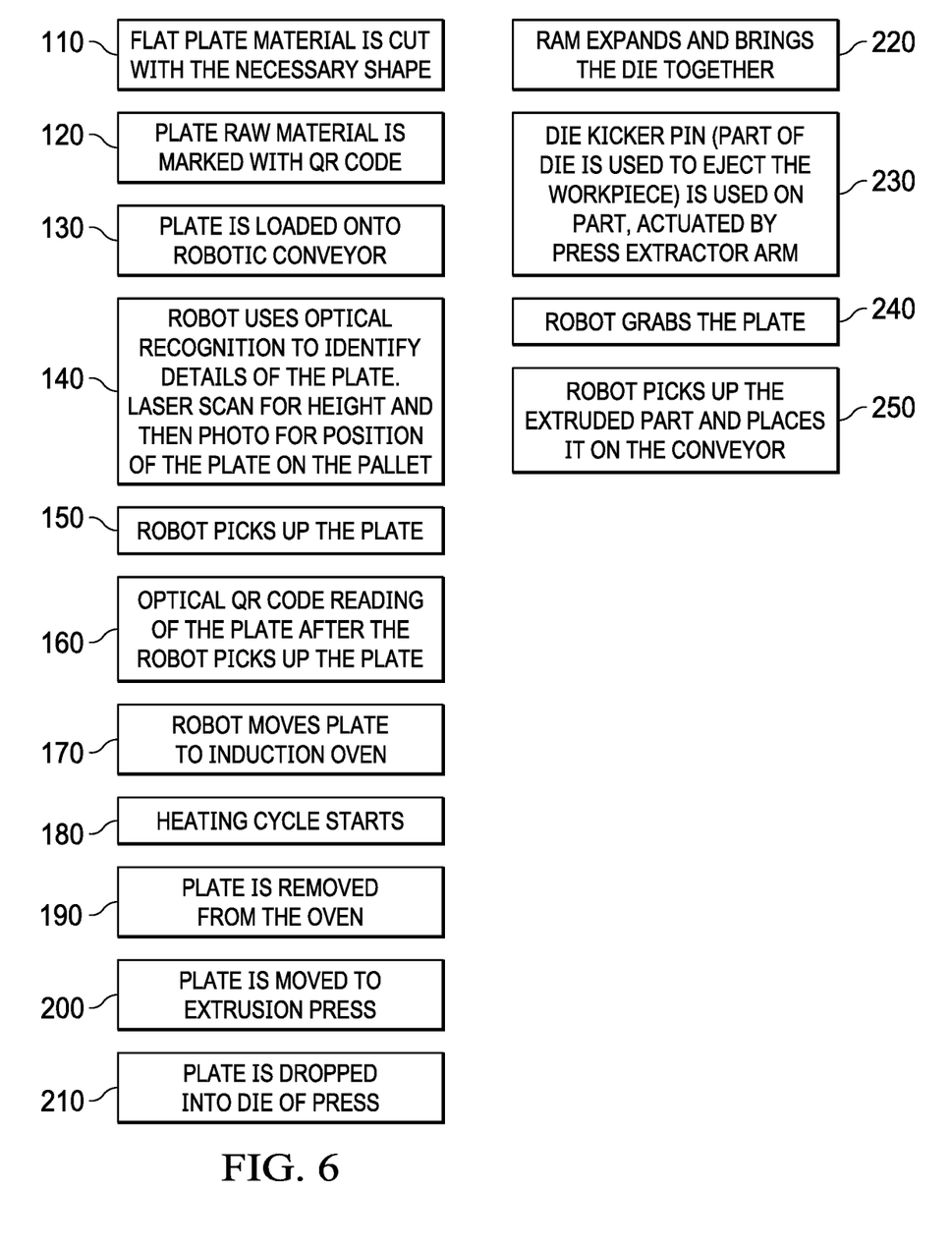
FIG. 6 provides the method steps for an embodiment of the present disclosure.

An embodiment of the manufacturing process of a split tee, spherical tee and/or FES using the presently disclosed manufacturing cell is disclosed in FIG. 6. In step 110, raw material flat plates with the necessary shape, and cutouts if applicable, are provided. In embodiments of the present disclosure, the plate for the branch half of the split tee, spherical tee, or FES is provided with an elliptical cutout, and plates for both the top and bottom (or sides) for split/spherical tees and FES have length to width ratios that have been optimized for the extrusion process.

In step 120, the raw material plates are marked with a QR Code. The QR Code is mapped to the unique material specifications and quality documents, such as the MTR. After marking, in step 130, the plate is loaded onto an input station (e.g. pallet or inbound conveyor). In step 140, the robotic device is instructed, by the computer processor, to retrieve the appropriate raw material plate. The robotic device uses its optical recognition to identify details of the plate. Laser scan are used for height determination, and photos are used to determine the position of the desired plate on the pallet or inbound conveyor.

In step 140, the robotic device computes the number of raw material plates by determining the height of the top plate and comparing to the height of the pallet or inbound conveyor. The robotic device additionally confirms the shape (length×width) of the plate and determines whether or not an elliptical cutout exists. Further, the robotic device determines the position of the raw material plate to ensure the pickup is square to the arms, or grippers, of the robotic device.

In step 150, the robotic device picks up the appropriate raw material plate. In certain embodiments of the present disclosure, the robotic device has magnetic grippers to pick up the raw material plates, but other means for picking up the plates can also be used. The optical QR code on the plate is read in step 160. Once the QR code is read, the tracking of the plate begins. The plate identity is confirmed, and the MTR data is linked.

Based on the plate identity and the manufacturing schedule, the robot moves the plate to the appropriate oven in step 170. As mentioned above, the manufacturing cell can have one or more ovens. In some embodiments, at least one oven is an induction oven. Alternatively, all ovens in the manufacturing cell can be induction based to allow for quick and even heating of the raw material plates.

In step 180, the heating cycle starts. The temperature of the oven is measured and monitored by the control room. In step 190 the robotic device removes the heated raw material plate from the oven and determines whether the plate is ready for extrusion. While the plate is hot, the robotic device uses gripping devices sized and shaped to facilitate picking up the plate as its magnetic grippers may no longer be able to transport the heated plate. The plate temperature is measured with an IR Camera and the plate temperature is compared to an acceptable range. If the plate temperature falls outside the acceptable range, the robotic device can return the plate to the oven for additional heating. Alternatively, or in addition to, the robotic device can send a message to the processer, which can then send an alert, text, or email to the operator. Recording of the temperature and/or remedial activity for the plate can be performed by the processor in conjunction with the robotic device, and added to the MTR.

In step 200, the plate is moved to the appropriate (if more than one) extrusion press. The IR Camera takes another temperature measurement of the plate prior to placement in the extrusion press. The new temperature measurement is compared to the acceptable range to ensure that the plate is ready for extrusion. If the temperature of the plate has fallen out of an acceptable range, the robotic device can take corrective action (i.e. returns the plate to the oven or sets the plate in a stand to cool) and/or have the computer processor send an alert.

If the plate is at an appropriate temperature, in step 210, the plate is placed into the die of the press. The robotic device ensures the heated raw material plate is centered and that the plate is square to the die. In some embodiments, step 210 additionally includes placing the plate onto an extendable loading table.

In step 220, the ram of the extrusion press is extended and the die is brought together. The information collected in step 140 is communicated by the robotic device and logical programming to the extrusion press to prevent crashes due to differing plates (i.e. with or without cut-outs). Only plates with cutouts send a signal to the extrusion press to actuate the punch after the die is brought together, creating the extruded tee. Plates without cutouts are completed after the upper and lower dies are brought together. During this step, the pressures and forces are monitored by the control room. In some embodiments of the present disclosure, the pressure and force readings can be used to build statistical models to enable predictive maintenance of the dies and ensure quality control is maintained in the extrusion process.

After extrusion, in step 230, a die kicker is used on the extruded component part to facilitate retrieving of the extruded component part by the robotic device. The die kicker is actuated by the press extractor arm. The robotic device will not attempt to pick up the extruded component part unless the kicker pin has been activated and is in its actuated position.

In step 240, the robotic device picks up the extruded part and places the extruded part on an output station such as a conveyor in step 250. The extruded part is now ready for final processing or shipment.

Figure 7:
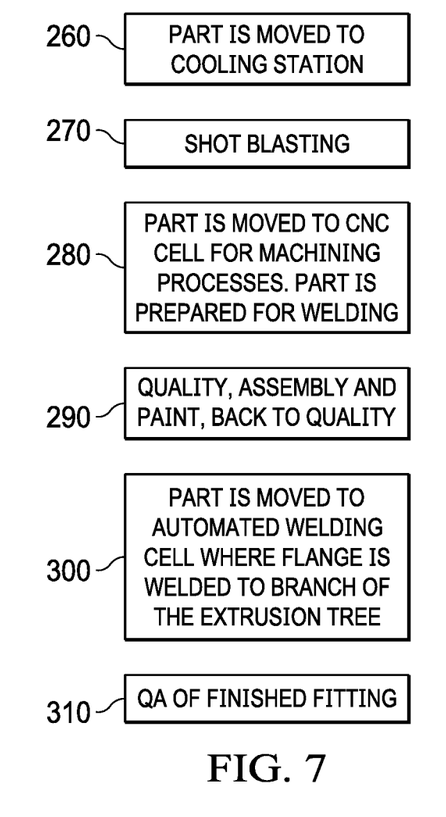
FIG. 7 provides the method steps for an embodiment of the present disclosure that automated final processing.

In alternate embodiments, final processing is also be conducted automatically. FIG. 7 provides the final processing steps that take place after the extruded part has been placed on the conveyor.

In step 260, the extruded part is moved to a cooling station. In step 270, the extruded part is subjected to shot blasting to remove scale and clean-up the surface. In step 280, the extruded part is moved to a CNC cell for machining processes and the part is prepared for welding. The high repeatability of the extruded tees of the present disclosure allows for automated welding to be possible.

In step 290, quality is checked, the part is assembled and painted and sent back to quality. Depending on the application, the split/spherical tee and FES may be shipped "as is" at this point. If not, in step 300, the part is moved to an automated welding cell where the flange is welded to the branch of the extruded tee or FES. Finally, in step 310, QA of the finished fitting is performed.

FIG. 3B provides a schematic of an alternative layout of manufacturing cell 330 that includes the final processing steps 260-310 discussed with reference to FIG. 7. As shown, embodiment 330 comprises the stations/components shown in FIG. 3A with the addition of a cooling station 80, a shot blast station 82, a CNC machining station 84, an automated welding station 86, and an automated painting station 88. The robotic device 44 is able to access each addition component using extended track 350. It should be understood that the layout is not limited to that shown in FIG. 3A or FIG. 3B. The layout is only limited by the ability of the robotic device 44 to access the various process pieces of equipment.

The benefits on the presently disclosed method is the speed at which components can be made and the increase in precision of the split tee, spherical tee and FES component parts. The robotic device reduces the time needed to manufacture split tee, spherical tee and FES component parts by at least 50% compared to split tee, spherical tee and FES component parts manufactured without using robotic devices. When used in combination with inductive ovens, the time needed to manufacture split tee, spherical tee and FES component parts is reduced by at least 75% compared to split tee, spherical tee and FES component parts manufactured without using robotic devices. Further, the robotic device improves the repeatability and precision of dimensions of the split tee, spherical tee and FES components by at least 95%, and preferable at least 98% compared to manufacturing methods that do not use robotic devices. This allows the branched and unbranched split tee, spherical tee and FES components to have acceptable tolerances ranges such that they can easily and securely mate at the seam.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

The invention claimed is:

1. A manufacturing cell for automated manufacture of pipe reinforcement components from raw material plates, the manufacturing cell comprising:
   an input conveyor for the raw material plates;
   one or more ovens for heating the raw material plates;
   one or more extrusion presses for extruding the heated raw material plates into one or more pipe reinforcement components;
   an output conveyor for the pipe reinforcement components;
   a robotic device disposed on and movable along a fixed track, wherein the robotic device is configured to move the raw material plates between the input conveyor, the one or more ovens, the one or more extrusion presses, and the output conveyor, the robotic device comprising:
   one or more arms comprising a magnetic gripper;
   a QR code reader; and
   at least one optical recognition device for determining an identity, size, and shape of the raw material plates, wherein the optical recognition device is configured to determine a height of a stack of the raw material plates and determine the shape of the raw material plates in the stack; and a control room having one or more computer processors for transmitting instructions for the automated manufacture of the pipe reinforcement components and receiving information from the robotic device, wherein the one or more computer processors is configured to:
  receive the height of the stack of the raw material plates from the robotic device and calculate a number of the raw material plates in the stack based on the height;
  receive the shape of the raw material plates in the stack from the robotic device and determine variations in dimensions of the raw material plates in the stack based on the shape of the raw material plates in the stack; and
  transmit instructions to the robotic device to select one or more of the raw material plates in the stack based on the variations in dimensions of the raw material plates in the stack.

2. The manufacturing cell of claim 1 further comprising at least one of a cooling station, a shot blast station, a CNC machining station, an automated welding station, and an automated painting station.

3. The manufacturing cell of claim 1, wherein the pipe reinforcement components are split tee components, spherical tee components, or full encirclement saddle components.

4. The manufacturing cell of claim 1, wherein the input conveyor is spaced apart from the output conveyor.

5. The manufacturing cell of claim 1, wherein at least one of the one or more ovens is an induction oven.

6. The manufacturing cell of claim 4, wherein the fixed track extends from the input conveyor to the output conveyor.

7. The manufacturing cell of claim 1, wherein the one or more extrusion presses comprise one or more kicker pins, wherein the one or more kicker pins eject the extruded heated raw material plates.

8. The manufacturing cell of claim 1, wherein the one or more extrusion presses comprise a sliding table, wherein the sliding table facilitates loading of the raw material plates into the one or more extrusion presses.

9. The manufacturing cell of claim 1, wherein the robotic device further comprises temperature sensors configured to determine a temperature of the raw material plates.

10. The manufacturing cell of claim 1, wherein the robotic device further comprises a transmitter to transmit collected information to the one or more computer processors.

11. The manufacturing cell of claim 2, wherein the fixed track extends from the input conveyor, to the one or more ovens, to the one or more extrusion presses, to the at least one of the cooling station, to the shot blast station, to the CNC machining station, to the automated welding station, to the automated painting station, and to the output conveyor.

12. The manufacturing cell of claim 9, wherein the one or more computer processors is configured to:
  receive the temperature of the raw material plates from the robotic device; and
  transmit instructions to the robotic device to deliver the raw material plates to the one or more ovens for heating when the temperature is outside of a temperature threshold.

13. The manufacturing cell of claim 9, wherein the one or more computer processors is configured to:
  receive the temperature of the raw material plates from the robotic device; and
  transmit an alert when the temperature is outside of a temperature threshold.

14. The manufacturing cell of claim 1, wherein the optical recognition device is configured to determine whether the raw material plates include an elliptical cutout.

* * * * *